United States Patent
Aoki et al.

(10) Patent No.: US 6,871,696 B2
(45) Date of Patent: Mar. 29, 2005

(54) VEHICLE SEAT AIR CONDITIONING SYSTEM

(75) Inventors: Shinji Aoki, Chiryu (JP); Yuichi Kajino, Nagoya (JP); Takeshi Yoshinori, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/738,699

(22) Filed: Dec. 15, 2000

(65) Prior Publication Data

US 2001/0004008 A1 Jun. 21, 2001

(30) Foreign Application Priority Data

Dec. 20, 1999 (JP) .......................................... 11-361837

(51) Int. Cl.⁷ .......................... F25B 29/00; B60H 1/22; B60H 1/34; B60H 1/32; B60H 1/00
(52) U.S. Cl. .......................... 165/43; 165/42; 165/203; 454/120; 454/907
(58) Field of Search .......................... 165/42, 43, 202, 165/203, 201; 454/120, 907

(56) References Cited

U.S. PATENT DOCUMENTS

| | | | | |
|---|---|---|---|---|
| 2,718,839 A | * | 9/1955 | Wilfeit et al. | |
| 3,127,931 A | * | 4/1964 | Johnson | |
| 3,394,887 A | * | 7/1968 | Megargle et al. | |
| 4,572,430 A | * | 2/1986 | Takagi et al. | 237/12.3 A |
| 4,665,971 A | * | 5/1987 | Sakurai | 165/42 |
| 5,181,553 A | * | 1/1993 | Doi | 165/43 |
| 5,385,382 A | * | 1/1995 | Single, II et al. | |
| 5,921,100 A | * | 7/1999 | Yoshinori et al. | 165/43 |
| 6,079,485 A | * | 6/2000 | Esaki et al. | 165/43 |
| 6,105,667 A | * | 8/2000 | Yoshinori et al. | 165/240 |
| 6,296,562 B1 | | 10/2001 | Uemura et al. | |

FOREIGN PATENT DOCUMENTS

| | | | |
|---|---|---|---|
| JP | 60-139518 | * | 7/1985 |
| JP | 61-24611 | * | 2/1986 |
| JP | 3-189225 | * | 8/1991 |
| JP | 4-135914 | * | 5/1992 |
| JP | 4-230412 | * | 8/1992 |
| JP | 5-124418 | * | 5/1993 |
| JP | 5-124421 | * | 5/1993 |
| JP | 5-139143 | * | 6/1993 |
| JP | 5-193342 | * | 8/1993 |
| JP | 6-24236 | * | 2/1994 |
| JP | 8-25946 | * | 1/1996 |
| JP | 10-278556 | * | 10/1998 |
| JP | 11-48772 | * | 2/1999 |
| JP | 11-123925 | * | 5/1999 |
| JP | 11-123931 | * | 5/1999 |
| JP | 11-129738 | * | 5/1999 |
| JP | 11-129739 | * | 5/1999 |
| JP | 11-170842 | * | 6/1999 |

* cited by examiner

Primary Examiner—John K. Ford
(74) Attorney, Agent, or Firm—Harness, Dickey & Pierce, PLC

(57) ABSTRACT

A vehicle seat air-conditioning system is used with a main air-conditioning unit which operates in one of a plurality of air blow modes. The main air-conditioning unit has an air-conditioned air outlet-port for supplying air-conditioned air irrespective of the air mode. The vehicle seat air-conditioning system includes an air-conditioned air duct connected to the air-conditioned air outlet-port, a seat-air duct connected to the air-conditioned air duct to supply the air-conditioned air to the inside of a seat and an air blower unit for blowing the air-conditioned air.

10 Claims, 5 Drawing Sheets

VEHICLE SEAT AIR CONDITIONING SYSTEM

CROSS REFERENCE TO RELATED APPLICATION

The present application is based on and claims priority from Japanese Patent Application Hei 11-361837 filed Dec. 20, 1999, the contents of which are incorporated herein by reference.

BACKGROUND OF THE INVENTION

1. Field of the Invention

The present invention relates to a vehicle seat air-conditioning system that supplies air-conditioned air of a vehicle air-conditioning unit into the inside of vehicle seats and blows out from the seats.

2. Description of the Related Art

U.S. Pat. No. 6,059,018 or corresponding Japanese Patent Application JP-A-11-28928 discloses a vehicle seat air-conditioning system. The disclosed vehicle-seat-air-conditioning system supplies air-conditioned air of a main air-conditioning unit for a passenger compartment to the inside of vehicle seats though a rear foot duct.

The main air-conditioning unit includes a unit case, in which a cool-air duct, a warm-air duct, and a rear foot duct are formed and an air-switching door is disposed between the cool-air duct and the warm-air duct. The rear foot duct is connected to the inside of the seat.

When an air-blow mode of the air-conditioning unit is a foot mode, the air-switching door connects the rear foot duct to the warm-air duct to supply warm air. On the other hand, when the air-blow mode is a face mode, the air-switching door connects the rear foot duct to the cool-air duct to supply cool air.

However, the above-described vehicle seat air-conditioning system cannot provide air-conditioned air different from air-conditioned air supplied to the passengers on the rear seat. For example, if the main air-conditioning unit is operated by a driver in the bi-level (B-L) mode, cooled air blows on the feet of the rear-seat passenger whether he or she likes it or not. If, on the other hand, the main air-conditioning unit is operated in the defroster (DEF) mode, no air blows on the feet of the rear-seat passenger whether he or she likes it or not. In addition, the air-switching door necessitates additional volume and cost of the main air-conditioning unit.

SUMMARY OF THE INVENTION

Therefore, a main object of the invention is to provide a vehicle seat air-conditioning system that can provide comfortable air-conditioned air irrespective of the air-blow mode.

According to a main feature of the invention, a vehicle seat air-conditioning system is used with a main air-conditioning unit. The vehicle seat air-conditioning system includes an air-conditioned air duct connected to an air-conditioned air port of the main air-conditioning unit which always supplies air-conditioned air irrespective of the air-blow modes, a seat-air duct that supplies the air-conditioned air to the inside of a seat, and an air-blow unit that blows the air-conditioned air from the seat.

According to another feature of the invention, the air-conditioned-air duct is connected to a SIDE port of the main air-conditioning unit, which always supplies the air-conditioned air irrespective of the air-blow mode.

Therefore, no substantial modification of the main air-conditioning unit is necessary.

According to another feature of the invention, the air-conditioned air duct includes a warming air duct and a cooling air duct disposed in a rear FOOT duct of the main air-conditioning unit. It is preferable to further include a seat-air-switching door for selectively connecting one of the warming-air duct and the cooling-air duct to the seat-air-duct.

Therefore, it is possible to supply to a passenger sitting on the seat specifically provided comfortable air-conditioned air.

According to another feature of the invention, the air blower unit includes a fan motor, a centrifugal fan driven by the fan motor and a blower case. The blower unit may include an inside-air inlet port, an air-conditioned air inlet-port and an inlet-port switching door for selectively connecting the inside of the blower case to the inside-air inlet port or the air-conditioned air inlet-port.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A preferred embodiment of the present invention is described with reference to the appended drawings.

Figure 1:
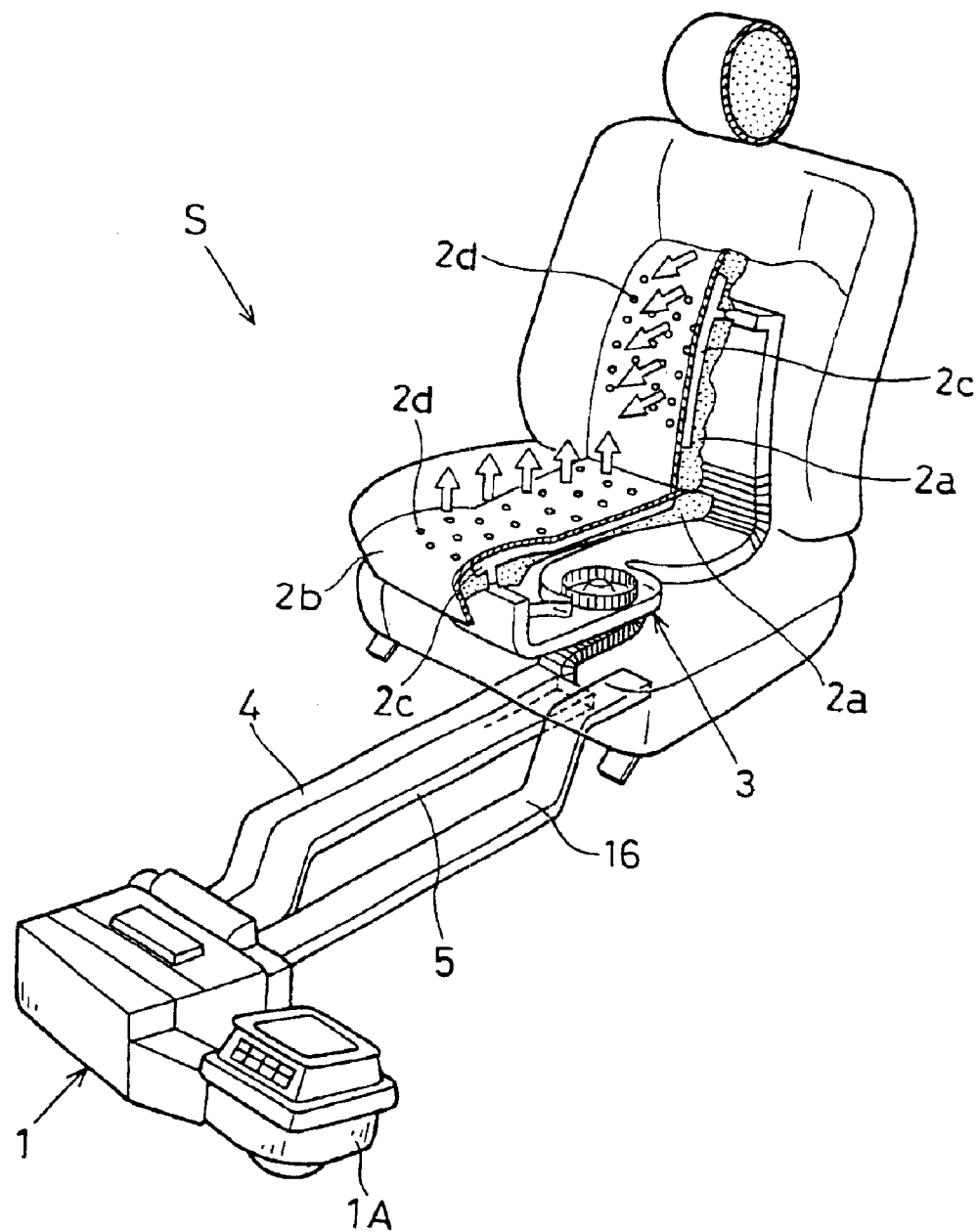
FIG. 1 is a perspective view of a vehicle seat air-conditioning system according to a preferred embodiment of the invention.

As shown in FIG. 1, vehicle seat air-conditioning system S is disposed inside and in the back of seat 2. Vehicle seat air-conditioning system S includes seat blower unit 3, cooling-air ducts 4 and warming-air duct 5 connected between main air-conditioning unit 1 and seat blower unit 3. Seat 2 is comprised of a seat back and a seat cushion, which are covered with leather, moquette, or the like. Air path 2c is disposed inside seat 2 to supply air-conditioned air from seat blower unit 3 to the seat surface. The seat, which is covered with leather or the like, has a plurality of air-vent holes 2d. If the seat is covered with moquette or other coarse cloth, it is not necessary to deliberately form such vent holes.

Figure 2A:
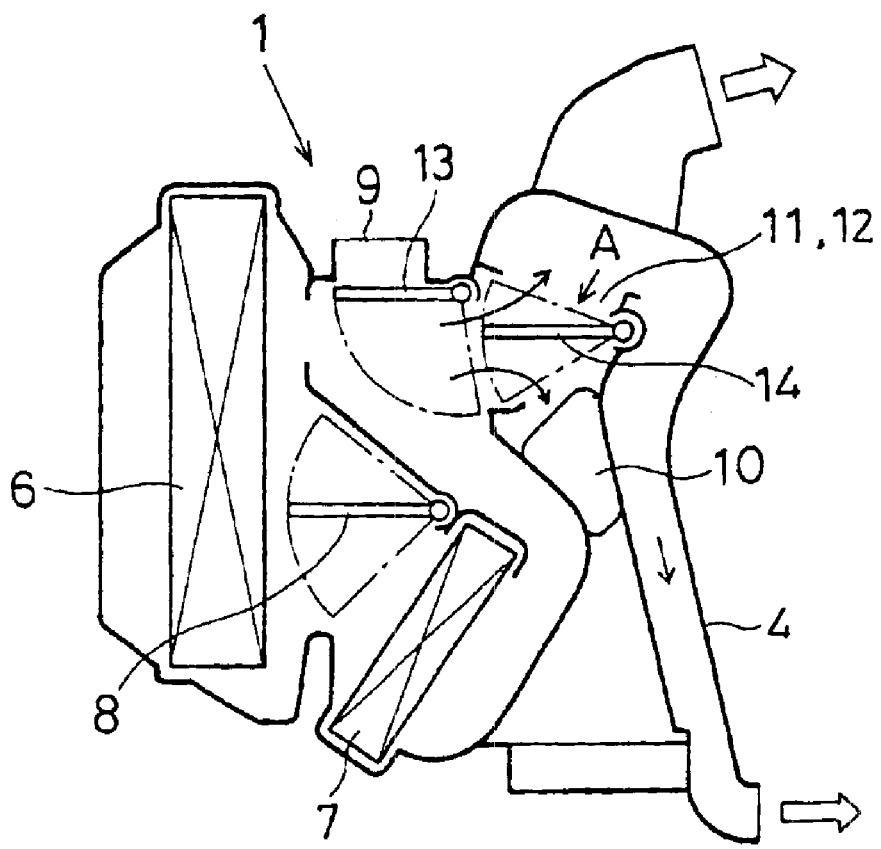
FIG. 2A is a cross-sectional view of a main air-conditioning unit.
Figure 2B:
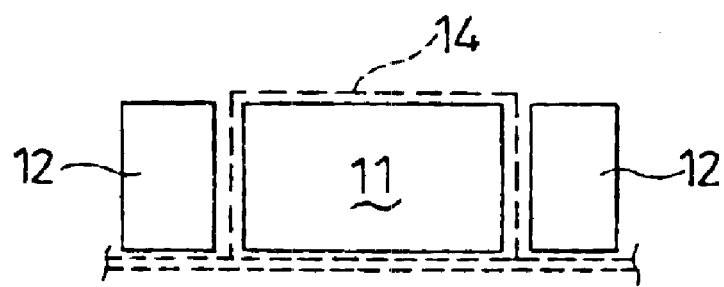
FIG. 2B is a side view of a FACE port and SIDE ports viewed from position A in FIG. 2A of the vehicle seat air-conditioning system shown in FIG. 1.

Main air-conditioning unit 1 is a well-known air-mixing type air-conditioner, which includes evaporator 6, heater core 7, air-mixing door 8, and etc, as shown in FIG. 2. Main air-conditioning unit 1 controls air-mixing door to mix air cooled by evaporator 6 and air heated by heater core 7, thereby providing desired air-conditioned air.

Main air-conditioning unit 1 has a plurality of air supply ports 9–12 and air-switching doors 13 and 14. The plurality of air supply ports includes DEF-port 9, FOOT-port 10, FACE-port 11 and a pair of SIDE-ports 12. Air switching door 13 is a DEF-door that opens or closes DEF-port, and air-switching door 14 is a FACE-FOOT door that opens or closes FOOT-port 10 or FACE-port 11. The pair of SIDE-ports 12 are disposed at opposite (right and left) sides of FACE-port 11. The pair of SIDE ports 12 always opens and, in other words, is not opened or closed by any of air switching doors 13 and 14. Therefore, the air-conditioned air is always supplied from the pair of SIDE-ports 12 irrespective of the air-blow mode being selected.

Figure 3:
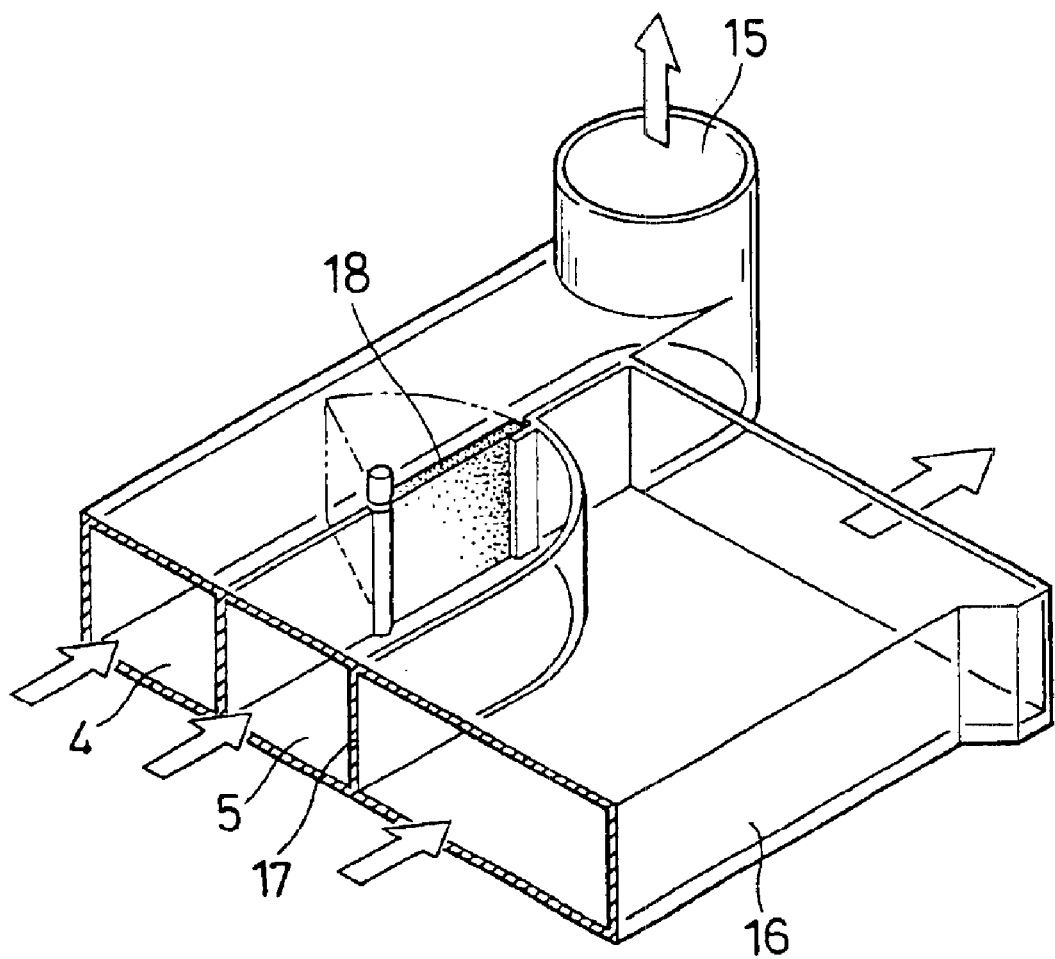
FIG. 3 is a perspective view of a warming-air duct, a cooling-air duct, and a rear FOOT duct of the vehicle seat air-conditioning system shown in FIG. 1.
Figure 4:
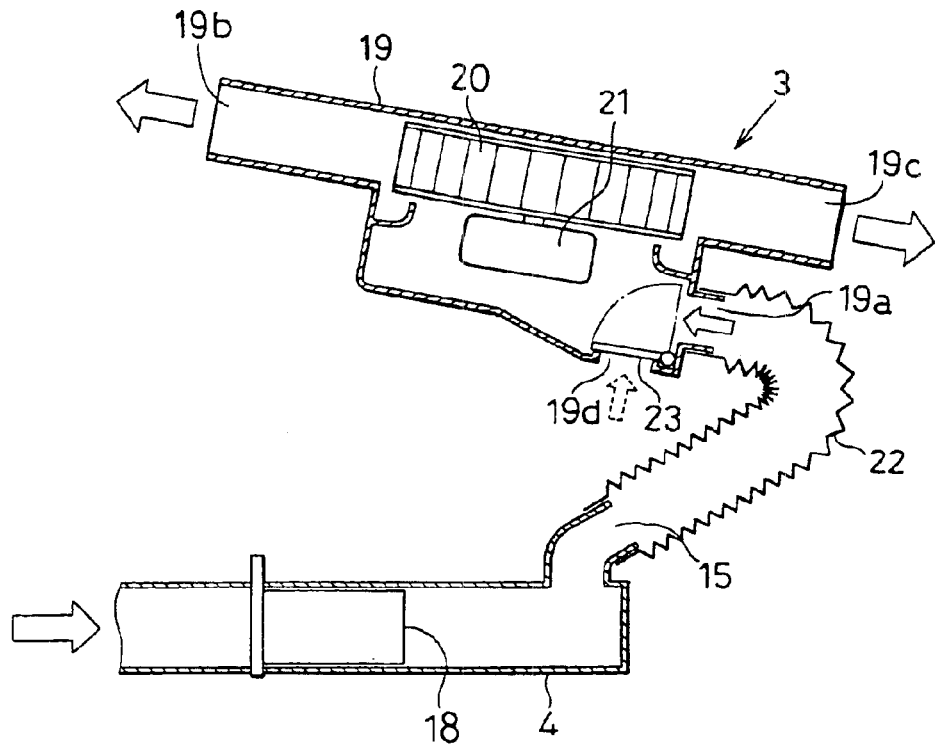
FIG. 4 is a cross-sectional side view of a seat-air-blower unit of the vehicle seat air-conditioning system shown in FIG. 1.
Figure 5:
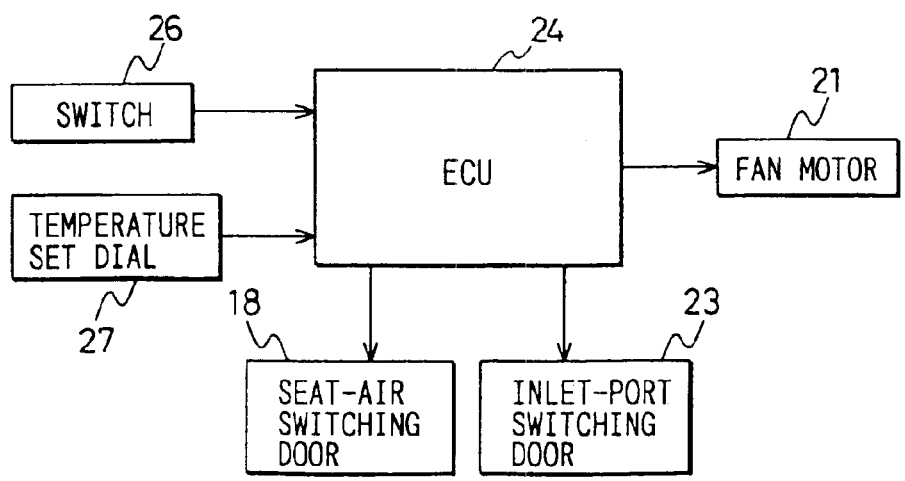
FIG. 5 is is a block diagram of an electronical control unit of the vehicle seat air-conditioning system according to the preferred embodiment.

As shown in FIG. 3, cooling-air duct 4 and warming-air duct 5 merge at the downstream ends thereof to form a joint duct having joint port 15 at the downstream end thereof. Cooling-air duct 4 is connected to SIDE port 12 to conduct air-conditioned air. Warming-air duct 5 is formed in rear FOOT duct 16 and separated from rear FOOT duct 16 by partition 17. Cooling-air duct 4 also can be formed in rear FOOT duct 16 in the same manner. Seat-air-switching door 18 is disposed at the merging portion of cooling-air duct 4 and warming-air duct 5. Seat-air-switching door 18 selectively connects joint port 15 either to cooling-air duct 4 or to warming-air duct 5. As shown in FIG. 5, seat blower unit 3 is comprised of blower case 19, centrifugal fan 20 disposed in blower case 19, fan motor 21 and others. When fan motor 21 rotates centrifugal fan 20, the air-conditioned air of main air-conditioning unit 1 is taken into cooling-air duct 4 or warming-air duct 5.

Figure 6A:
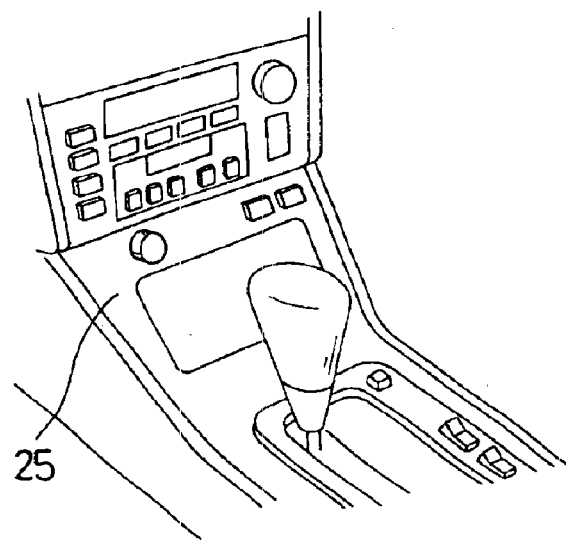
FIGS. 6A, 6B and 6C are schematic perspective diagrams illustrating a control panel of the vehicle seat air-conditioning system according to the preferred embodiment.
Figure 6B:
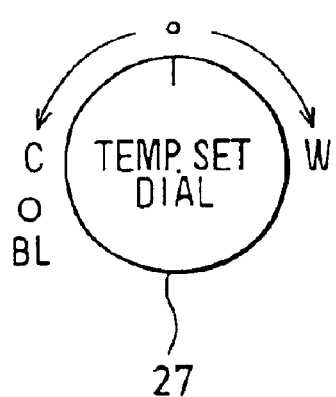
Figure 6C:
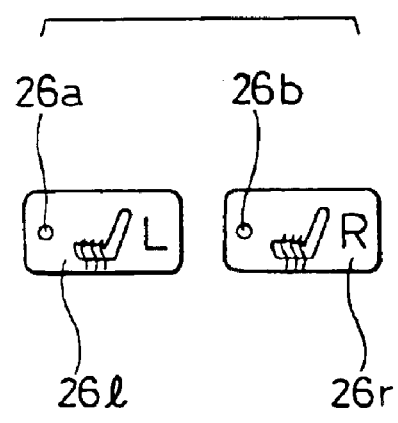

Blower case 19 has air-conditioned air inlet port 19a that is connected to joint port 15 via flexible duct 22, first air outlet port 19b connected to air path 2c of the seat cushion, second air outlet port 19c connected to air path 2c of the seat back and inside-air inlet port 19d. Inlet-port-switching door 23 is disposed in blower case 19 to selectively open or close air-conditioned air inlet port 19a or inside-air inlet port 19d. Vehicle-seat-air condition system S is controlled by ECU 24, as shown in FIG. 5. ECU 24 has a microcomputer, which calculates a target air-blow temperature (TAO) according to set room-temperature, vehicle thermal load such as room temperature, outside temperature, or sun light condition. When seat-air-conditioning switch 26 of a control panel is turned on, ECU 24 controls the rotation speed of fan motor 21 and the positions of air-switching door 18 and inlet-port-switching door 23 according to TAO. Seat-air-conditioning switch 26 can be provided separately for the right front air-conditioning seat switch 26r with indicator lamp 26b and the left front air-conditioning seat switch 26l with indicator 26a, as shown in FIGS. 6A, 6B and 6C. Indicator lamps 26a and 26b indicate on or off state of air-conditioning switches 26l and 26r.

When seat-air-conditioning switch 26 is turned on, the rotation speed (or control voltage) of fan motor 21, the positions of air-switching door 18 and inlet-port switching door 23 are calculated according to TAO to provide control signals, which are sent to a motor drive circuit (not shown) and to actuators (not shown) of switching doors 18 and 23. It is possible to use a supplemental TAO specific to the vehicle seat air-conditioning system. In this case, temperature set dial 27 is disposed at the control panel to change the supplemental TAO, as schematically illustrated in FIGS. 6A, 6B and 6C. It is also possible to provide separate temperature set dials 27 respectively for the right and left front seats.

Seat-air-switching door 18 is controlled by ECU 24 according to TAO. If the FACE mode is selected, seat-air-switching door 18 closes warming-air duct 5 and opens cooling-air duct 4. On the other hand, if the FOOT mode is selected, seat-air-switching door 18 opens warming-air duct 5 and closes cooling-air duct 4. Seat-air-switching door 18 also takes a position to mix the air from cooling-air duct 4 and the air from warming-air duct 5 when temperature set dial 27 is turned to change the temperature of the seat-air-conditioned air.

Inlet-port-switching door 23 is controlled according to the condition of the passenger compartment. For example, if the passenger compartment is intended to cool down or warm up in a short time, inlet-port-switching door 23 is controlled to close inside-air inlet-port 19d and open air-conditioned air inlet-port 19a. However, if a passenger feels hot, inlet-port-switching door 23 can be manually controlled to change the warm air-conditioned air to the room or inside air.

Fan motor 21 is controlled with the terminal voltage that changes according to TAO. Normally, fan motor 21 is controlled to drive centrifugal fan 20 at a low-level. However, if the passenger compartment is cooled down or warmed up in a short time, fan motor 21 is controlled to drive centrifugal fan 20 before the seat-air-conditioning starts so that the blowing-air speed of the air blowing from seats is, for example, less than 0.4 m/s. As the temperature of the air-conditioned air is cooled down or warmed up, the terminal voltage of fan motor 21 is gradually increased, thereby, to increase the blowing-air speed.

Because cooling-air duct 4 of seat-air-conditioning system S is connected to side port 12, the following effects are provided: (1) air-conditioned air is always supplied to cooling-air duct; (2) the air-conditioned air supplied to cooling air duct 4 does not unexpectedly blow on rear seat passengers; and (3) no door is necessary to add to main air-conditioning unit 1.

As a variation, warming air duct 5 can be omitted if a user does not want the seat-air-conditioned air different from the air-conditioned air supplied from main air-conditioning unit 1. Cooling-air duct 4 can be connected to a portion of main air-conditioning unit 1 other than SIDE port if the air-conditioned air can be supplied from the portion irrespective of the air-blow mode.

An electric heater can be disposed at an upstream or downstream portion of fan 20 to supply warm air to cooling-air duct 4 in a short time.

It is also possible to control vehicle seat air-conditioning system S separately from main air-conditioning unit by an ECU other than ECU 24.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than restrictive, sense.

What is claimed is:

1. A vehicle seat air-conditioning system which supplies air-conditioned air to a passenger compartment and to a seat of a vehicle comprising:

a main air-conditioning-unit which provides air-conditioned air, said main air-conditioning-unit including an evaporator, a heater core, an air-mixing door, and an air-conditioned air chamber disposed downstream of said air mixing door which provides said air conditioned air, a plurality of airsupply ports and an air switching door, said plurality of air supply ports including a FACE port and a SIDE port, said SIDE port being disposed at a right or left lateral side of side of said FACE port and being directly connected to said air-conditioned air chamber from which the air conditioned air is supplied to the passenger compartment irrespective of operation of said air switching door, said FACE port being connected to said air-conditioned air chamber via said air switching door from which said air-conditioned air is supplied to the passenger compartment after being controlled by said air switching door;

an air-conditioned air duct connected to said SIDE port; and a seat air-conditioning unit, including said air-conditioned air duct, a seat blower unit connected to said air-conditioned air duct and an air path disposed inside said seat and connected to said seat blower unit, said seat blower unit blowing said air-conditioned air from the inside of said seat.

2. The vehicle seat air-conditioning system as claimed in claim 1 wherein said seat air-conditioning unit further comprises:

a warming-air duct connected between a downstream space of said heater core and a seat-air duct which supplies warming air heated by said heater core and a seat-air switching means which provides a mixture of said air-conditioned air and said warming-air.

3. The vehicle seat air-conditioning system as claimed in claim 2, wherein said seat-air switching means comprises a seat-air-switching door disposed between said warming-air duct and said air-conditioning air duct.

4. The vehicle seat air-conditioning system as claimed in claim 3, wherein:

said seat-air switching door is disposed at a position where said seat blower unit and said air-conditioned air duct are connected.

5. The vehicle seat air-conditioning system as claimed in claim 3, wherein:

said seat air switching means further comprises a manually operated temperature setting dial and control means for controlling said seat-air switching door in response to a position of said manually operated temperature setting dial.

6. The vehicle seat air-conditioning system as claimed in claim 5 further comprising a control panel, wherein:

said manually operated temperature setting dial is disposed at said control panel.

7. The vehicle seat air-conditioning system as claimed in claim 1 further comprising a rear foot air duct separated from said air-conditioned air duct.

8. The vehicle seat air-conditioning system as claimed in claim 1, wherein said seat blower unit comprises a fan motor, a centrifugal fan driven by said fan motor and a blower case which accommodates said fan motor and said centrifugal fan.

9. The vehicle seat air-conditioning system as claimed in claim 8, wherein:

said seat blower unit further comprises an inside-air inlet-port, air-conditioned air inlet-port and an inlet-port switching door operated for selectively connecting the inside of said blower case to said inside-air inlet port or said air-conditioned air inlet-port.

10. An air-conditioning system which supplies air-conditioned air to a passenger compartment and to a seat of a vehicle, said air-conditioning system comprising a main air-conditioning-unit which includes an evaporator and a heater core and which operates in a plurality of air-blow modes that includes a foot mode, a face mode, a bi-level mode and a defroster mode and has an air FACE port which supplies said air-conditioned air to said passenger compartment during said face mode, an always open SIDE port disposed at a right or left lateral side of said FACE port which supplies said air-conditioned air to said passenger compartment and to said seat during all of said plurality of air-blow modes and a warming-air supply port in communication with said heater core, said air-conditioned air being created by mixing air cooled by said evaporator and air heated by said heater core;

an air-conditioned air duct connected to said SIDE port;

a seat-air duct connected between said air-conditioned air duct and the inside of said seat;

air blowing means connected to said seat-air duct for blowing said air-conditioned air from the inside of the said seat;

a warming-air duct connected between said warming-air supply port of said main air-conditioning unit and said seat air duct for supplying warming-air; and a seat-air-switching means for supplying a mixture of said air-conditioned air and said warming-air to said seat-air duct.

* * * * *